United States Patent
Noh

(10) Patent No.: US 7,716,550 B2
(45) Date of Patent: May 11, 2010

(54) SEMICONDUCTOR IC INCLUDING PAD FOR WAFER TEST AND METHOD OF TESTING WAFER INCLUDING SEMICONDUCTOR IC

(75) Inventor: Kwang-Sook Noh, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 346 days.

(21) Appl. No.: 11/938,480

(22) Filed: Nov. 12, 2007

(65) Prior Publication Data

US 2008/0184085 A1    Jul. 31, 2008

(30) Foreign Application Priority Data

Jan. 26, 2007    (KR) .................. 10-2007-0008614

(51) Int. Cl.
    *G06F 11/00*    (2006.01)
(52) U.S. Cl. ...................... 714/743; 714/730
(58) Field of Classification Search ................ 324/765; 365/230.06, 201; 714/718, 734, 743, 730
See application file for complete search history.

(56) References Cited

U.S. PATENT DOCUMENTS

| | | | | |
|---|---|---|---|---|
| 6,249,478 B1 * | 6/2001 | Sugiyama | ............... | 365/230.06 |
| 6,351,833 B1 * | 2/2002 | Nomura | ................. | 714/718 |
| 6,661,719 B1 * | 12/2003 | Shih et al. | .............. | 365/201 |
| 7,050,343 B2 * | 5/2006 | Kumar et al. | ............. | 365/201 |
| 7,076,710 B2 * | 7/2006 | Knips et al. | .............. | 714/734 |
| 7,259,582 B2 * | 8/2007 | Ong | .................. | 324/765 |
| 2001/0049807 A1 * | 12/2001 | Kim | .................. | 714/743 |

FOREIGN PATENT DOCUMENTS

| | | |
|---|---|---|
| KR | 2001-0111951 | 12/2001 |
| KR | 2002-0017394 | 3/2002 |
| KR | 10-0474987 | 2/2005 |

OTHER PUBLICATIONS

English language abstract of Korean Publication No. 2001-0111951, Date: Dec. 20, 2001.
English language abstract of Korean Publication No. 2002-0017394, Date: Mar. 7, 2002.
English language abstract of Korean Publication No. 10-0474987, Date: Feb. 24, 2006.

* cited by examiner

*Primary Examiner*—David Ton
(74) *Attorney, Agent, or Firm*—Muir Patent Consulting, PLLC

(57) ABSTRACT

Provided are a semiconductor integrated circuit (IC) including a pad for a wafer test and a method of testing a wafer including a semiconductor IC. The semiconductor IC includes a first address generator, a second address generator, and an address output unit. The first address generator generates a normal address having (M+N) bits or a first test address having M bits corresponding to voltages applied to a plurality of address pads. The second address generator generates a second test address having N bits corresponding to a voltage applied to an additional pad. Therefore, according to the semiconductor IC and the wafer test method, an additional pad is provided to generate an N-bit test address in wafer test mode such that the number of pads needed to test a device can be reduced. As a result, more semiconductor ICs can be tested simultaneously.

20 Claims, 4 Drawing Sheets

SEMICONDUCTOR IC INCLUDING PAD FOR WAFER TEST AND METHOD OF TESTING WAFER INCLUDING SEMICONDUCTOR IC

CROSS-REFERENCE TO RELATED PATENT APPLICATION

This application claims the benefit of Korean Patent Application No. 10-2007-0008614, filed on Jan. 26, 2007, in the Korean Intellectual Property Office, the disclosure of which is incorporated herein in its entirety by reference.

BACKGROUND OF THE INVENTION

1. Field of the Invention

The present invention relates to a semiconductor device, and more particularly, to a semiconductor integrated circuit (IC) including an additional pad for reducing the number of pads receiving a test address and thereby increasing the number of semiconductor ICs that can be tested simultaneously during a wafer test process, and a method of testing a wafer including a semiconductor IC.

2. Description of the Related Art

Semiconductor IC chips are formed on wafers during a semiconductor manufacturing process. Wafer-level testing is generally performed to eliminate defective IC chips before they are packaged, thereby reducing the cost of packaging and package-level testing of chips that are already known to be defective. In a wafer test process, only certain properties of the semiconductor IC chips are tested rather than testing all properties of the chips. For example, activation of memory cells on a semiconductor IC chip may be the only property that is tested at the wafer level.

Wafer testing is performed using test addresses generated by applying voltages to pads of a semiconductor IC chip. The voltages are generated by a driver on an external test device connected to a probe card. The test voltages may be used during a wafer testing process to determine, for example, whether a memory cell corresponding to a test address is activated.

Generally, multiple semiconductor IC chips are tested simultaneously, and the number of semiconductor IC chips that can be tested simultaneously is determined by the number of pins on the probe card and the number of drivers on the external test device. In other words, the number of semiconductor IC chips that can be tested simultaneously is determined by the number of test channels that can electrically connect chip pads to the test device.

However, as the integration level of semiconductor IC chips increases, the number of address bits (the number of pads) also increases. As a result, the number of semiconductor IC chips that can be tested simultaneously decreases since the number of test channels is limited even though the required number of address bits increases. Therefore, the productivity of the semiconductor IC chip manufacturing process decreases.

SUMMARY OF THE INVENTION

The present invention provides a semiconductor integrated circuit (IC) designed for increasing the number of semiconductor ICs that can be tested simultaneously.

The present invention also provides a wafer test method designed for increasing the number of semiconductor ICs that can be tested simultaneously.

According to an aspect of the present invention, there is provided a semiconductor IC (integrated circuit) comprising: a first address generator; a second address generator; and an address output unit.

The first address generator generates a normal address having (M+N) bits or a first test address having M bits corresponding to voltages applied to a plurality of address pads. The second address generator generates a second test address having N bits corresponding to a voltage applied to an additional pad. The address output unit outputs the normal address or a test address in response to a mode selection signal.

The test address is used for testing a wafer including the semiconductor IC. The normal address is used for a writing/reading operation or a package test of the semiconductor IC.

The mode selection signal has a first logic level for testing the semiconductor IC in a wafer test mode. The address output unit outputs the test address when the mode selection signal is at the first logic level.

The second address generator may comprise: a reference voltage generator; a comparator; and a decoder. The reference voltage generator generates a plurality of reference voltages having different voltage levels in response to an external power voltage. The comparator generates an output by comparing the reference voltages with the voltage applied to the additional pad. The decoder generates the second test address by decoding the output of the comparator.

The reference voltage generator may comprise: a pad to receive the external power voltage; and a series of resistors to generate the reference voltages by dividing the external power voltage. The reference voltage generator may generate at least three reference voltages. The comparator may comprise comparison units that compare the reference voltages with the voltage applied to the additional pad, respectively. The external power voltage may be equal to a power voltage of the semiconductor IC, or different from the power voltage of the semiconductor IC.

The first address generator may comprise: first pads; and second pads. The first pads receive voltages corresponding to the M bits. The second pads receive voltages corresponding to the N bits. The second pads are pads to which voltages corresponding to a bank address of the semiconductor IC are applied.

The address output unit may comprise a multiplexer to select the N bits of the normal address or the N bits of the second test address. The address output unit may comprise a dynamic random address memory (DRAM).

According to another aspect of the present invention, there is provided a method of testing a wafer including a semiconductor IC, the method comprising: generating a first test address having M bits corresponding to voltages applied to a plurality of address pads of the semiconductor IC; generating a second test address having N bits corresponding to a voltage applied to an additional pad of the semiconductor IC; and outputting a test address by combining the first M-bit test address and the second N-bit test address in response to a mode selection signal.

According to a further aspect of the present invention, a semiconductor IC may comprise: a first address generator to generate a normal address or a first test address in response to digital signals applied to a plurality of address pads; a second address generator to generate a second test address in response to an analog signal applied to an additional pad; and an address output unit to output the normal address or a test address in response to a mode selection signal; wherein the test address is obtained by combining the first test address and the second test address.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
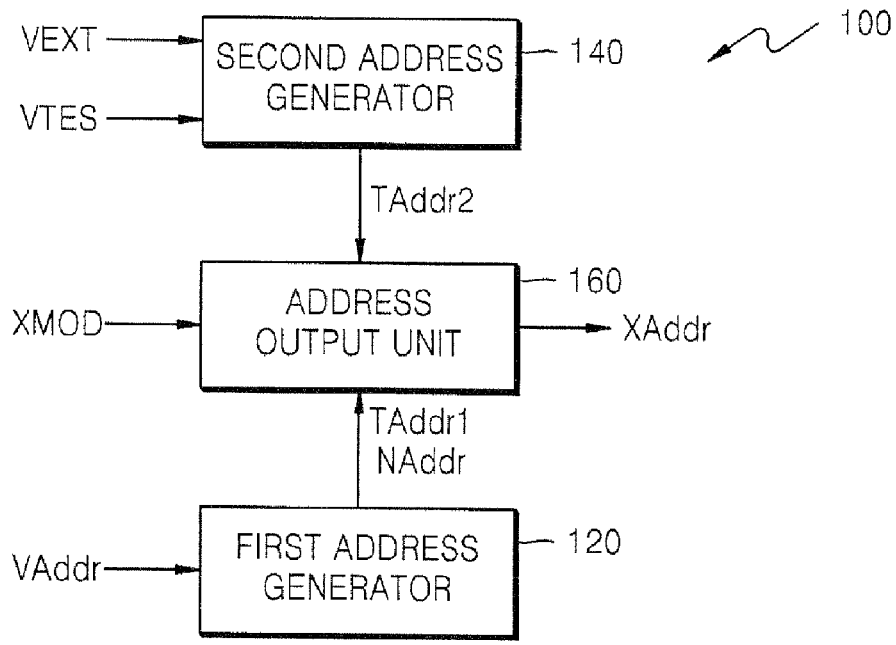
FIG. 1 is a partial block diagram illustrating a semiconductor integrated circuit (IC) according to an embodiment of the present invention.

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

FIG. 1 is a partial block diagram illustrating a semiconductor integrated circuit (IC) 100 according to an embodiment of the present invention.

Referring to FIG. 1, the semiconductor IC 100 includes a first address generator 120, a second address generator 140, and an address output unit 160. The first address generator 120 generates a normal address NAddr having M+N bits or a first test address TAddr1 having M bits corresponding to voltages applied to a plurality of address pads. Here, M and N are natural numbers, and in particular, N is larger than one.

Figure 4:
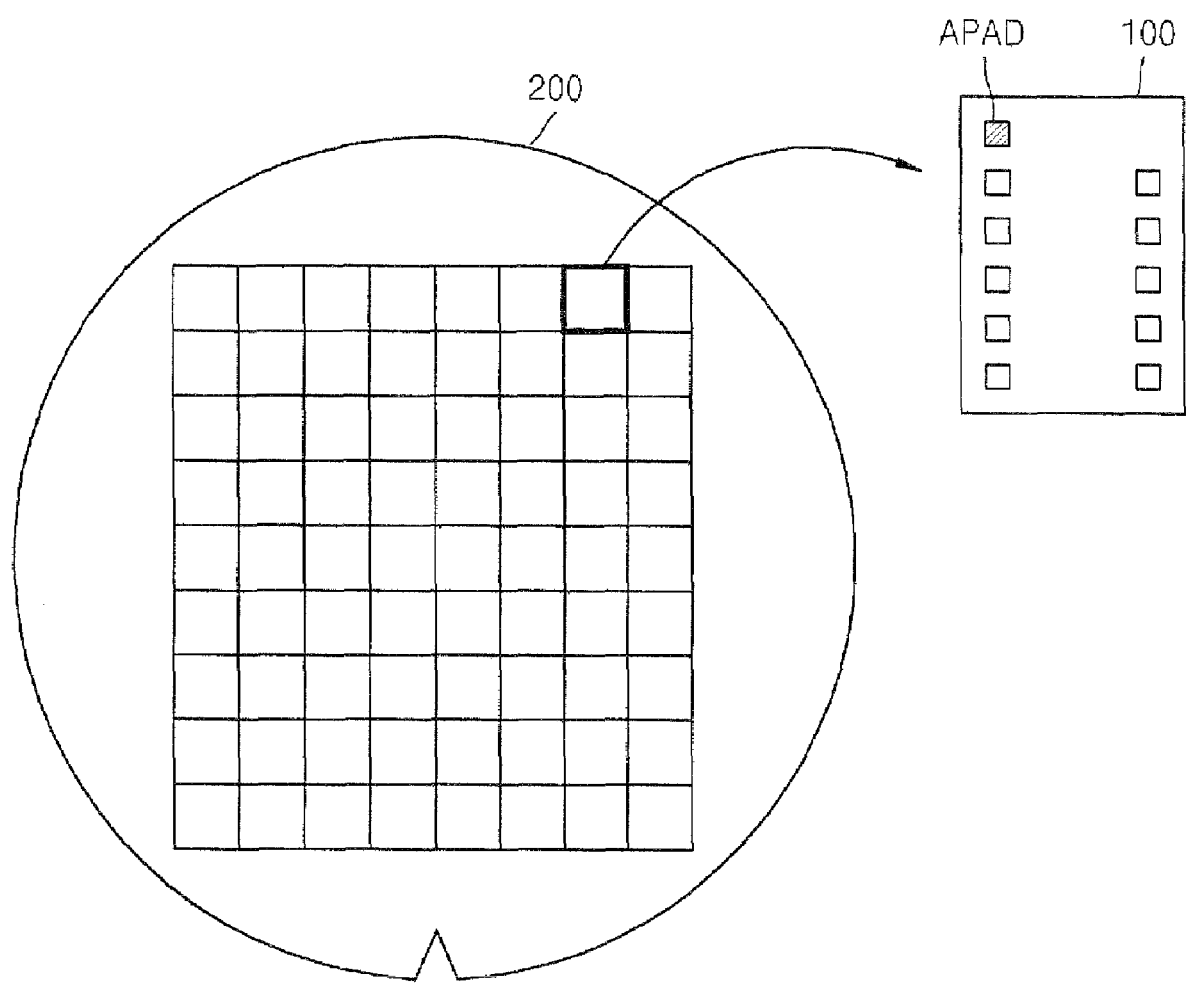
FIG. 4 is a schematic view illustrating a wafer including the semiconductor IC depicted in FIG. 1, according to an embodiment of the present invention.

Hereinafter, when a wafer 200 (refer to FIG. 4) including the semiconductor IC 100 is tested, it will be denoted as "wafer test mode". In the semiconductor IC 100 of the current embodiment, a mode selection signal XMOD is activated to a first logic level in wafer test mode.

In addition, when a writing/reading operation is performed on the semiconductor IC 100 or a package test operation is performed, it will be denoted as "normal mode". Furthermore, an address used in wafer test mode will be denoted as a test address, and an address used in normal mode will be denoted as a normal address.

Moreover, it is assumed that M+N bits are necessary for denoting an address of a memory cell of the semiconductor IC 100. The memory of the semiconductor IC 100 may be, for example, a dynamic random access memory (DRAM).

As explained above, in wafer test mode for a conventional semiconductor IC, a test device generates a test address by applying voltages corresponding to the test address to address pads of the semiconductor IC through a probe card. Thus, conventional wafer testing requires as many test channels as the number of bits (pads) of the test address.

However, in wafer test mode for the semiconductor IC 100 of the current embodiment, the first address generator 120 generates a first test address TAddr1 having only M bits, and the second address generator 140 generates a second test address TAddr2 having N bits for the remaining N bits of an (M+N)-bit test address.

Figure 2:
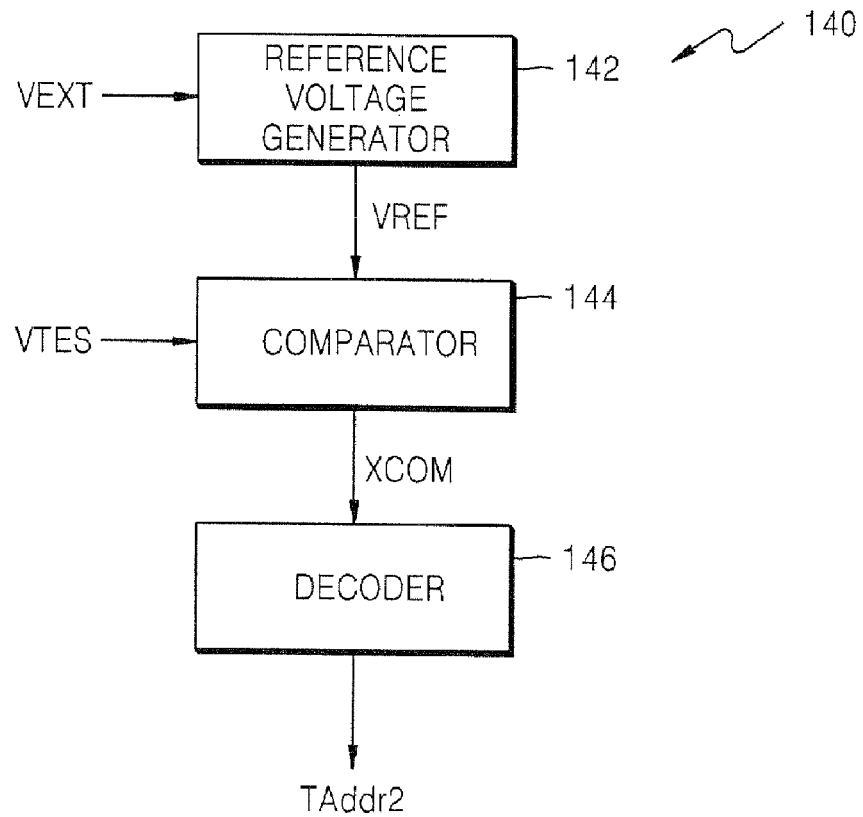
FIG. 2 is a schematic block diagram illustrating a second address generator of the semiconductor IC depicted in FIG. 1, according to an embodiment of the present invention.

FIG. 2 is a schematic block diagram illustrating the second address generator 140 of the semiconductor IC depicted in FIG. 1, according to an embodiment of the present invention. Referring to FIG. 2, the second address generator 140 generates a second N-bit test address TAddr2 corresponding to a voltage applied to an additional pad. To generate the second test address TAddr2 having N bits in response to the voltage applied to the single additional pad, the second address generator 140 includes a reference voltage generator 142, a comparator 144, and a decoder 146.

The reference voltage generator 142 generates a plurality of reference voltages VREFs having different levels in response to an external power voltage VEXT. The comparator 144 generates an output XCOM by comparing the reference voltages VREFs with a voltage VTES applied to the additional pad. The decoder 146 decodes the output XCOM of the comparator 144 to generate a second test address TAddr2. The second address generator 140 will be described later in more detail with reference to FIG. 3.

Since the second address generator 140 generates an N-bit address corresponding to a voltage applied to the single additional pad, the number of pads for applying a test address can be reduced. Therefore, according to the current embodiment of the present invention, wafer testing for a semiconductor IC requires fewer test channels as compared with a conventional wafer test method for a semiconductor IC.

Referring again to FIG. 1, when a mode selection signal XMOD is at the first logic level (i.e., in wafer test mode), the address output unit 160 outputs a test address. Here, the test address is generated by combining (e.g., concatenating) the first M-bit test address TAddr1 and the second N-bit test address TAddr2. On the other hand, when the address selection signal XMOD is at a second logic level (i.e., in normal mode), the address output unit 160 outputs the normal address NAddr.

Hereinafter, wafer testing for a semiconductor IC will be described with reference to FIG. 3 in which the semiconductor IC 100 of FIG. 1 is illustrated in more detail, according to an embodiment of the present invention.

Figure 3:
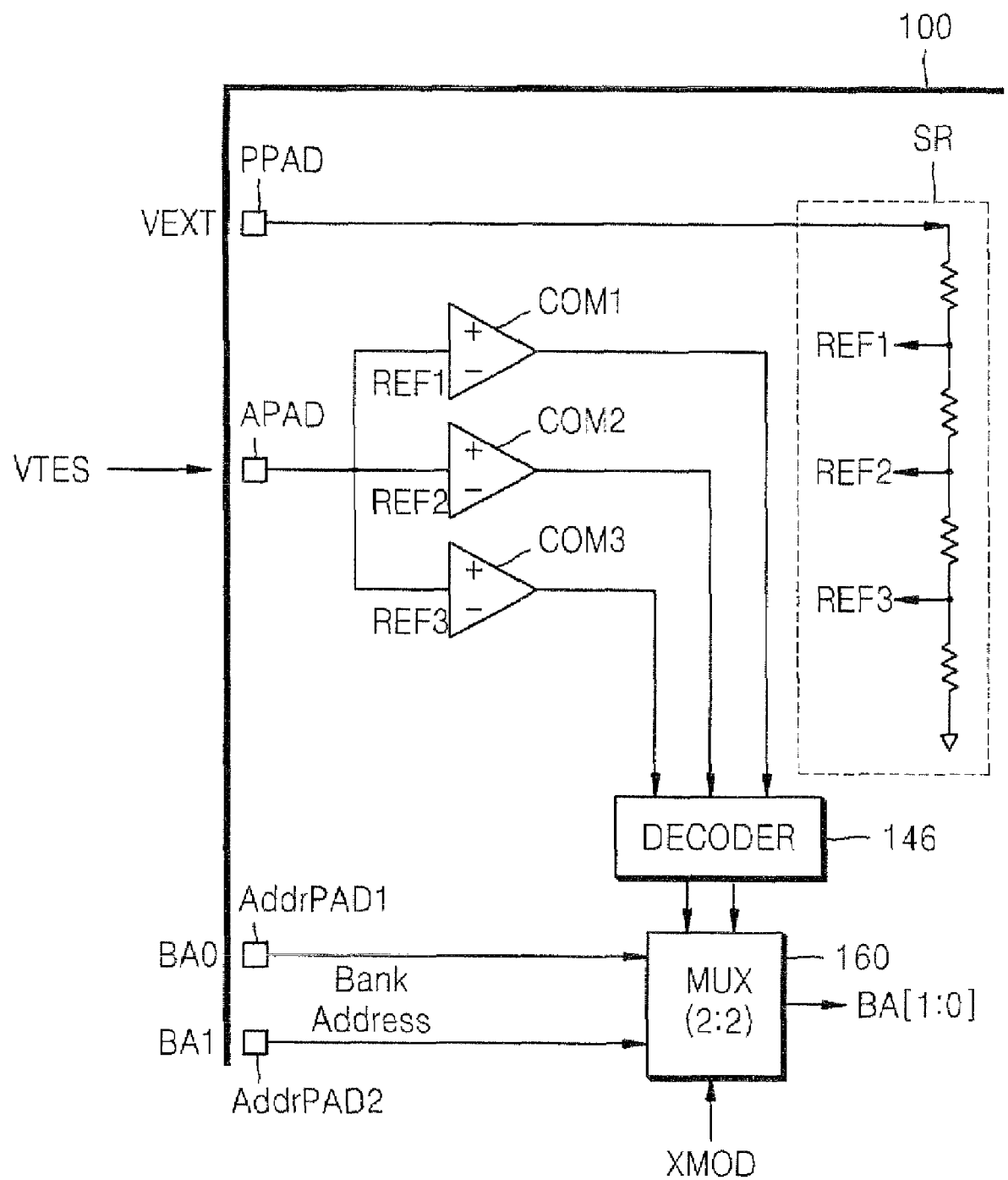
FIG. 3 is a detailed view illustrating the semiconductor IC depicted in FIG. 1 according to an embodiment of the present invention.

Referring to FIGS. 1 through 3, to generate an (M+N)-bit test address used in wafer test mode, the first address generator 120 of the semiconductor IC 100 generates a first M-bit test address TAddr1, and the second address generator 140 of the semiconductor IC 100 generates a second N-bit test address TAddr2.

The first address generator 120 includes first pads (not shown) and second pads AddrPAD1 and AddrPAD2. The first pads receive voltages corresponding to the M bits. The second pads AddrPAD1 and AddrPAD2 receive voltages BA0 and BA1 corresponding to the N bits. That is, the number of the first pads of the first address generator 120 is M, and the number of second pads of the first address generator 120 is N. In FIG. 3, for example, two pads AddrPAD1 and AddrPAD2 are shown as the second pads. In this case, voltages BA0 and BA1 corresponding to a 2-bit bank address BA[1:0] of the semiconductor IC 100 may be applied to the two pads AddrPAD1 and AddrPAD2.

In normal mode, the semiconductor IC 100 of the current embodiment generates a normal address NAddr corresponding to voltages applied to the (M+N) address pads of the first address generator 120. In wafer test mode, the semiconductor IC 100 operates as follows. In wafer test mode, the second address generator 140 is activated when a voltage is applied to an additional pad APAD. When the voltage is applied to the additional pad APAD, comparison units COM1 through COM3 of the comparator 144 compare the voltage VTES applied to the additional pad APAD with reference voltages VREFs, respectively. Then, the comparison units COM1 through COM3 output comparison results, respectively.

The reference voltage generator 142 generates the reference voltages VREFs. The reference voltage generator 142 includes a pad PPAD to receive an external power voltage VEXT and a series of resistors SR to divide the external power voltage VEXT to obtain the reference voltages VREFs. In the embodiment of FIG. 3, the reference voltage generator 142 generates first to third reference voltages VREF1 through VREF3.

Here, the external power voltage VEXT used in wafer test mode can be equal to the power voltage of the semiconductor IC 100. When the semiconductor IC 100 includes a DRAM as described above, the external power voltage VEXT may be equal to the power voltage (about 1.2 V) of the DRAM. Alternatively, the external power voltage VEXT can be higher than the power voltage of the semiconductor IC 100 in order to perform the wafer testing process more easily.

Table 1 below shows an example of the external power voltage VEXT and the reference voltages REF that can be used for the semiconductor IC 100 in wafer test mode.

TABLE 1

| VEXT | REF1 | REF2 | REF3 |
|------|------|------|------|
| 4 V | 3 V | 2 V | 1 V |

When the voltage VTES applied to the additional pad APAD has a value between the values of the external power voltage VEXT and the first reference voltage VREF1, the decoder 146 may generate a value of "11" as the second test address TAddr2. When the voltage VTES has a value between the values of the first and second reference voltages VREF1 and VREF2, the decoder 146 may generate a value of "10" as the second test address TAddr2. When the voltage VTES has a value between the values of the second and third reference voltages VREF2 and VREF3, the decoder 146 may generate a value of "01" as the second test address TAddr2. When the voltage VTES has a value between the values of the third reference voltage VREF3 and a ground voltage (not shown), the decoder 146 may generate a value of "00" as the second test address TAddr2.

A multiplexer MUX of the address output unit 160 selects either the N bits of the normal address NAddr or the N bits of the second test address TAddr2. Therefore, in normal mode, the address output unit 160 outputs a bank address BA[1:0] corresponding to voltages BA0 and BA1 applied to the second pads AddrPAD1 and AddrPAD2. In wafer test mode, the address output unit 160 outputs the second test address TAddr2 generated as described above instead of the bank address BA[1:0] corresponding to the voltages BA0 and BA1 applied to the second pads AddrPAD1 and AddrPAD2.

As explained above, according to an embodiment of the present invention, the semiconductor IC includes an additional pad for generating an N-bit test address so that the number of pads to be connected to a test device in wafer test mode can be reduced, and the number of test channels can be reduced. As a result, according to an embodiment of the present invention, the number of semiconductor ICs that can be tested simultaneously can be increased.

Figure 5:
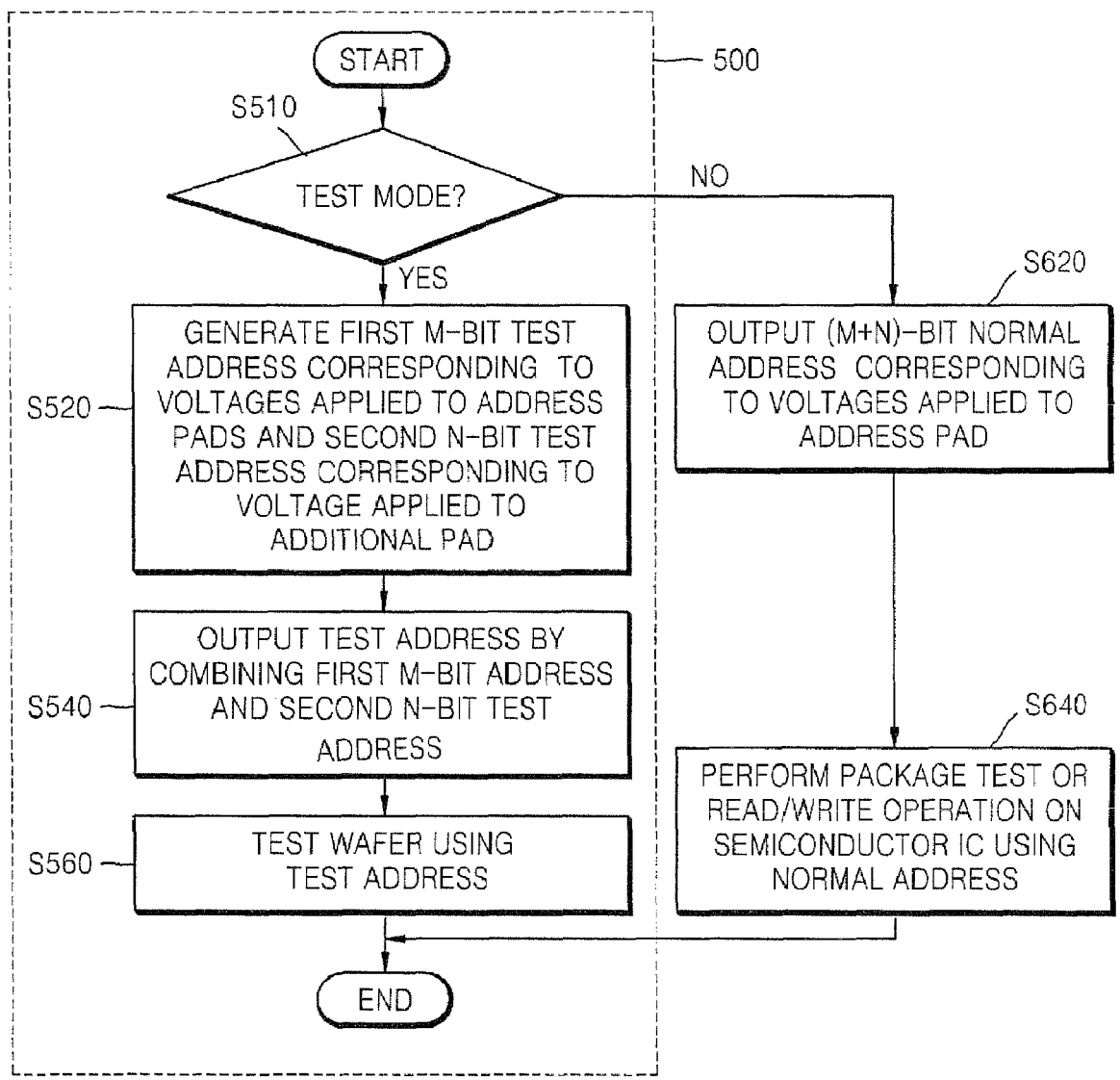
FIG. 5 is a flowchart for explaining a method of testing a wafer according to an embodiment of the present invention.

FIG. 5 is a flowchart for explaining a method of testing a wafer according to an embodiment of the present invention.

Referring to FIG. 5, the wafer test method first determines whether the current mode is wafer test mode in operation S510, and sets the mode selection signal XMOD to the corresponding logic level depending on the mode. If the current mode is wafer test mode, a test address is generated in operations S520 and S540 as described below.

In operation S520, a first M-bit test address is generated corresponding to voltages applied to a plurality of address pads of a semiconductor IC, and a second N-bit test address is generated corresponding to a voltage applied to an additional pad of the semiconductor IC. In operation S540, a test address is output by combining the first M-bit test address and the second N-bit test address in response to the mode selection signal XMOD.

As described above, according to an embodiment of a semiconductor IC or an embodiment of a method of testing a wafer including the semiconductor of the present invention, an additional pad is provided to generate an N-bit test address in wafer test mode such that the number of pads to be connected to a test device can be reduced. Therefore, more semiconductor ICs can be tested simultaneously.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. For example, although three reference voltages are used to generate a two-bit address from a voltage applied to a single pad in the semiconductor IC of FIG. 3, more reference voltages can be used to generate an address having three or more bits.

Therefore, the scope of the invention is defined not by the detailed description of the invention but by the appended claims, and all differences within the scope will be construed as being included in the present invention.

What is claimed is:

1. A semiconductor IC (integrated circuit) comprising:
   a first address generator to generate a normal address having (M+N) bits or a first test address having M bits corresponding to voltages applied to a plurality of address pads;
   a second address generator to generate a second test address having N bits corresponding to a voltage applied to an additional pad; and
   an address output unit to output the normal address or a test address in response to a mode selection signal;
   wherein the test address is obtained by combining the first M-bit test address and the second N-bit test address.

2. The semiconductor IC of claim 1, wherein the test address is used for testing a wafer including the semiconductor IC, and the normal address is used for a writing/reading operation or a package test of the semiconductor IC.

3. The semiconductor IC of claim 1, wherein the address output unit outputs the test address when the mode selection signal is at a first logic level, and outputs the normal address when the mode selection signal is at a second logic level.

4. The semiconductor IC of claim 1, wherein the second address generator comprises:
   a reference voltage generator to generate a plurality of reference voltages having different voltage levels in response to an external power voltage;
   a comparator to generate an output by comparing the reference voltages with the voltage applied to the additional pad; and a decoder to generate the second test address by decoding the output of the comparator.

5. The semiconductor IC of claim 4, wherein the reference voltage generator comprises:
 a pad to receive the external power voltage; and
 a series of resistors to generate the reference voltages by dividing the external power voltage.

6. The semiconductor IC of claim 5, wherein the reference voltage generator generates at least three reference voltages.

7. The semiconductor IC of claim 5, wherein the comparator comprises comparison units to compare the reference voltages with the voltage applied to the additional pad, respectively.

8. The semiconductor IC of claim 5, wherein the external power voltage is equal to a power voltage of the semiconductor IC.

9. The semiconductor IC of claim 5, wherein the external power voltage is different from a power voltage of the semiconductor IC.

10. The semiconductor IC of claim 1, wherein the first address generator comprises:
 first pads to receive voltages corresponding to the M bits; and
 second pads to receive voltages corresponding to the N bits.

11. The semiconductor IC of claim 10, wherein the second pads are pads to which voltages corresponding to a bank address of the semiconductor IC are applied.

12. The semiconductor IC of claim 1, wherein the address output unit comprises a multiplexer to select the N bits of the normal address or the N bits of the second test address.

13. The semiconductor IC of claim 1, further comprising a DRAM (dynamic random address memory).

14. A method of testing a wafer including a semiconductor IC, the method comprising:
 generating a first test address having M bits corresponding to voltages applied to a plurality of address pads of the semiconductor IC;
 generating a second test address having N bits corresponding to a voltage applied to an additional pad of the semiconductor IC; and
 outputting a test address by combining the first M-bit test address and the second N-bit test address in response to a mode selection signal.

15. The method of claim 14, wherein the mode selection signal has a first logic level to select a wafer test mode for testing the wafer including the semiconductor IC.

16. The method of claim 14, wherein generating the second test address comprises:
 generating a plurality of reference voltages having different voltage levels in response to an external power voltage of the semiconductor IC;
 comparing the reference voltages with the voltage applied to the additional pad; and
 generating the second test address by decoding the comparison result.

17. The method of claim 16, wherein generating the reference voltages comprises:
 receiving the external power voltage; and
 dividing the external power voltage in response to a series of resistors to obtain the reference voltages.

18. The method of claim 16, wherein generating the reference voltages comprises generating at least three reference voltages.

19. The method of claim 14, further comprising testing whether a cell of the semiconductor IC corresponding to the test address is activated.

20. A semiconductor IC (integrated circuit) comprising:
 a first address generator to generate a normal address or a first test address in response to digital signals applied to a plurality of address pads;
 a second address generator to generate a second test address in response to an analog signal applied to an additional pad; and
 an address output unit to output the normal address or a test address in response to a mode selection signal;
 wherein the test address is obtained by combining the first test address and the second test address.

* * * * *